United States Patent [19]

Myers

[11] 4,266,791
[45] May 12, 1981

[54] COLLAPSIBLE AND CARRYABLE CART

[76] Inventor: June L. Myers, P.O. Box 22086, Los Angeles, Calif. 90022

[21] Appl. No.: 79,827

[22] Filed: Sep. 28, 1979

[51] Int. Cl.³ .................................................. B62B 11/00
[52] U.S. Cl. ........................................ 280/37; 280/652
[58] Field of Search ................ 280/37, 638, 639, 651, 280/652; 190/11

[56] References Cited

U.S. PATENT DOCUMENTS

| | | | |
|---|---|---|---|
| 577,432 | 2/1897 | Kratzet | 280/37 |
| 1,131,559 | 3/1915 | Schrek | 280/37 |
| 1,409,787 | 3/1922 | Scarlett | 280/37 |
| 2,437,380 | 3/1948 | Cooklin et al. | 280/37 |
| 2,555,767 | 6/1951 | Simonian | 280/37 X |
| 2,604,333 | 7/1952 | Elmer | 280/37 |

FOREIGN PATENT DOCUMENTS 75068 6/1951 Norway ..................................... 280/37

*Primary Examiner*—John P. Silverstrim
*Assistant Examiner*—Michael Mar
*Attorney, Agent, or Firm*—Howard L. Johnson

[57] ABSTRACT

A collapsible and hand carryable utility cart formed by short upstanding walls fixed to each other and to a flat, planar bottom, the upper edges of the walls carrying upstanding side panels with bracing pins. Bottom has detachable axle support member with projecting pair of bolts insertable through bottom apertures for engagement inside container. Upon uncoupling, the axle support, individual wheels and U-handle are all storable within the shallow container which with downturned panel walls is carryable or storable on edge or presents its planar bottom for stacking or, upon inversion, provides a work surface.

6 Claims, 8 Drawing Figures

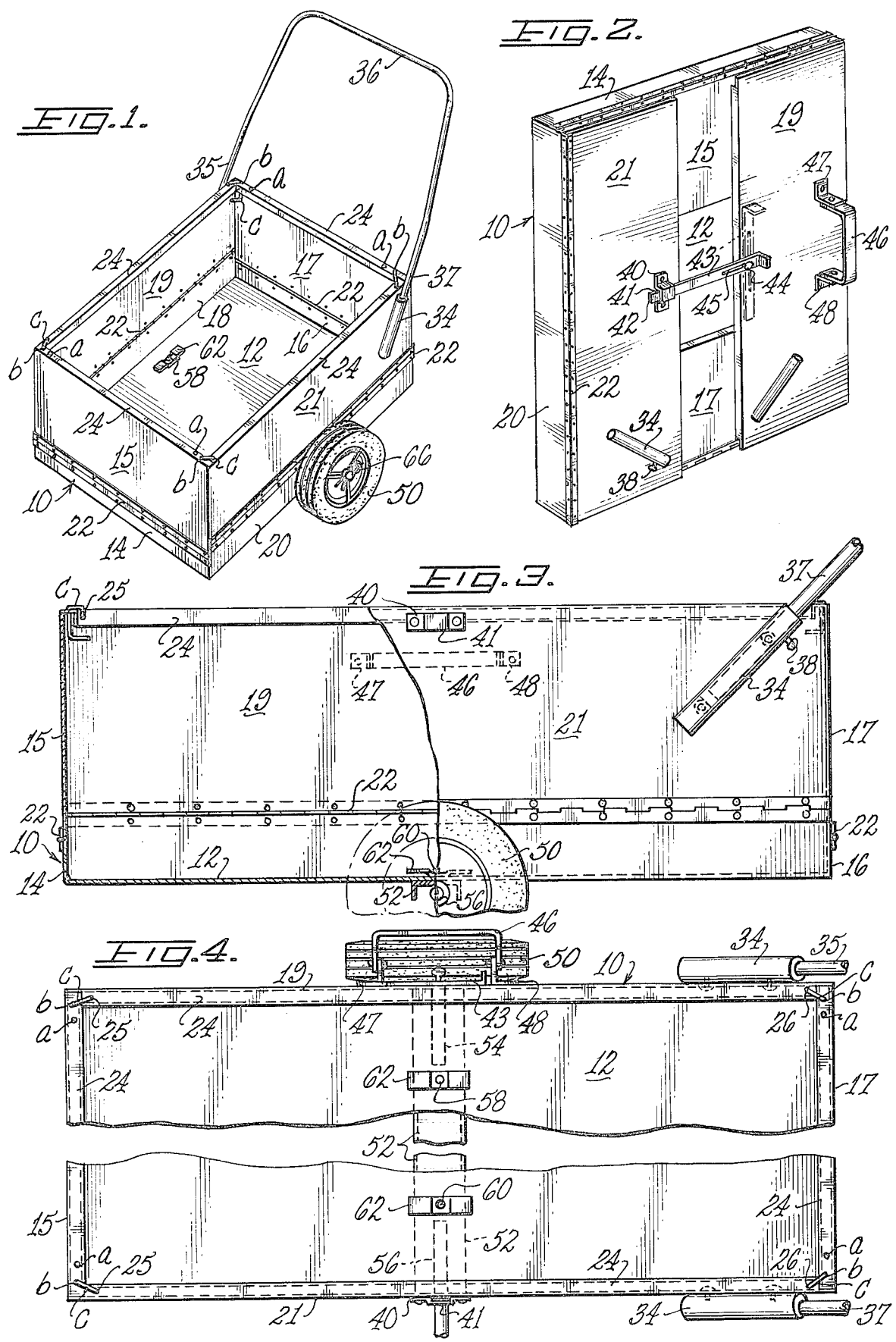

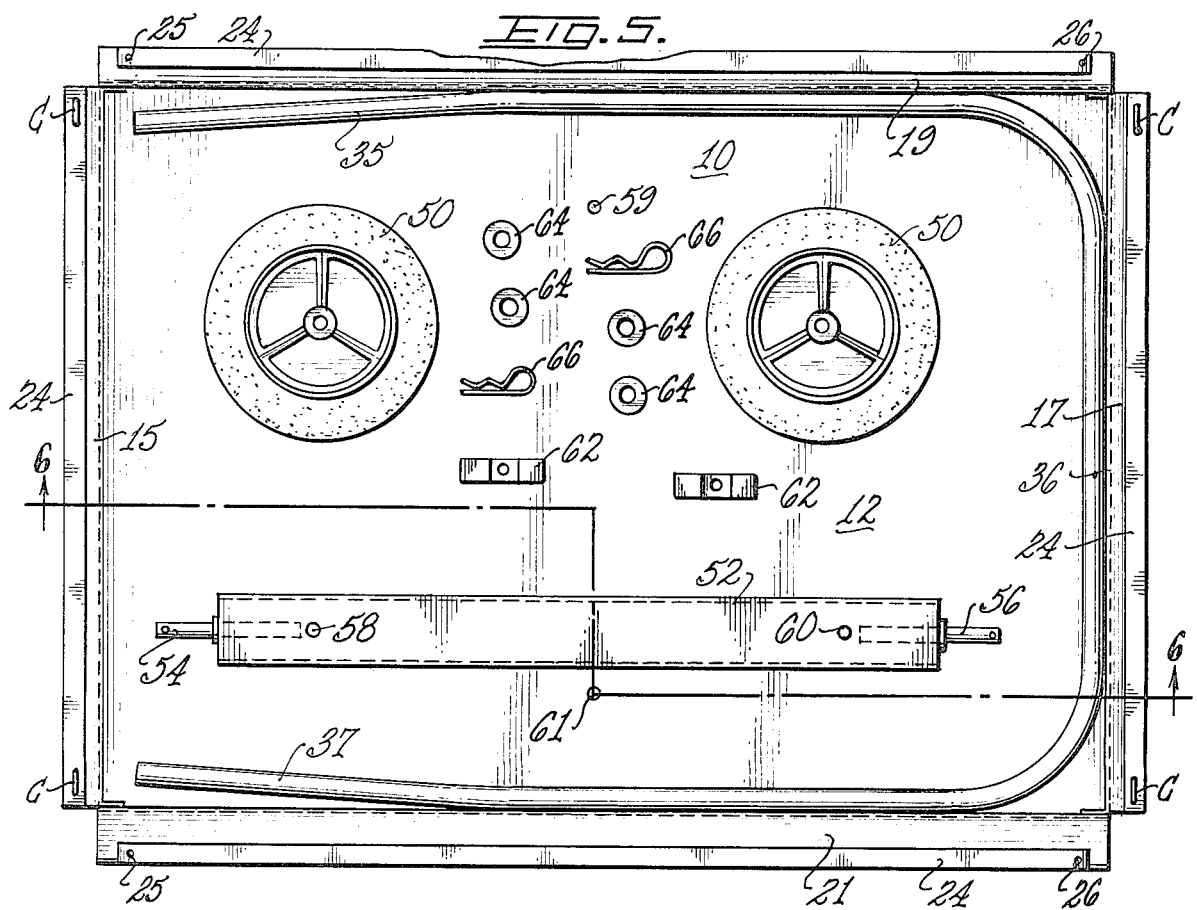
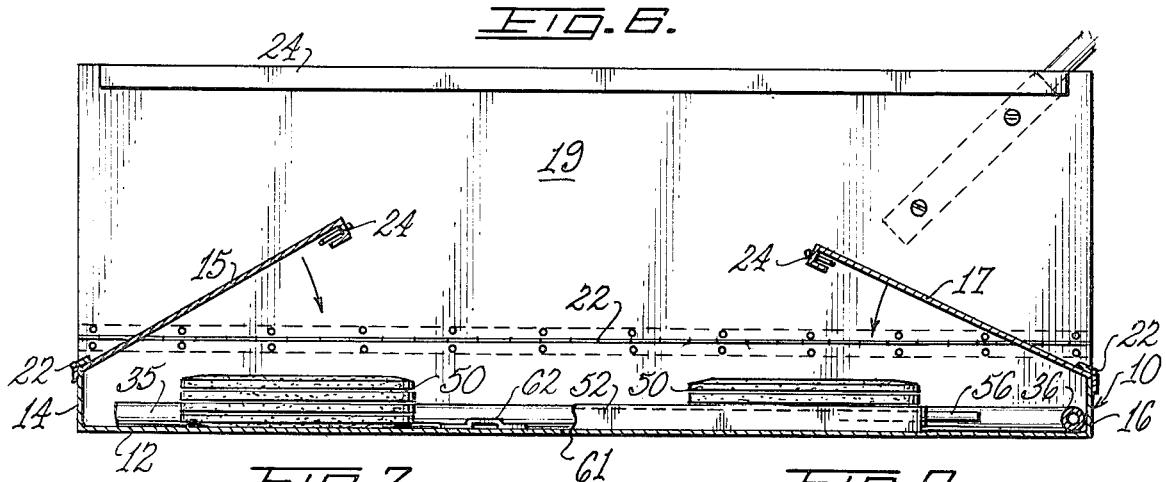
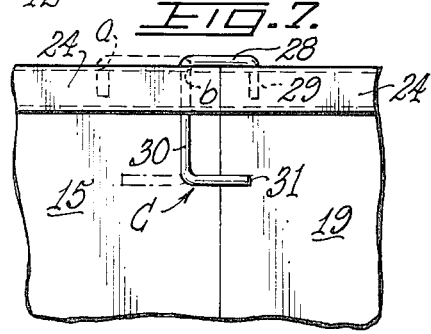
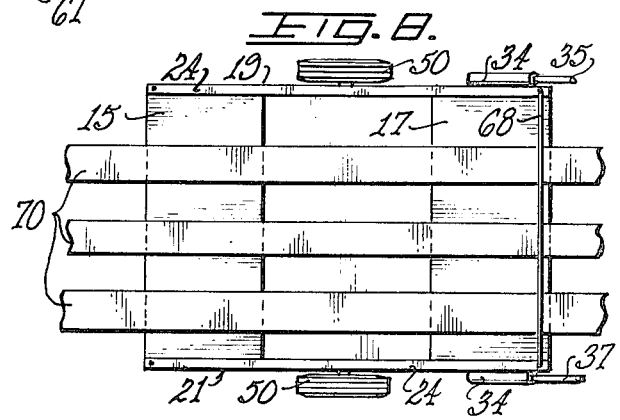

COLLAPSIBLE AND CARRYABLE CART

BACKGROUND

There are many examples in the past of vehicle chasses or containers which have detachable or attachable parts, such as wheels, closures and other parts. However after thus being "taken apart" the result is usually a pile of thus-useless parts which may have been broken down to bin-size but have no individual utility and are worrysome to reassemble. On the other hand, a kitchen storage bin which is fabricated so as to turn into a baby carriage, is usually difficult to transform and in any event expensive to manufacture. Accordingly it is a primary object to produce a simple utility cart which may be easily converted to a hand-carryable shallow container which is also storable on edge (in a small space) and even in this form presents a (bottom) planar surface which can readily be used as a work surface for a great variety of uses—from card table, drawing board, to a surface for cutting up fish or bait!

SUMMARY OF THE INVENTION

The invention provides a rectangular flat-bottom chassis or open-top container formed by low, fixed, side and end walls rimming the perimeter of a planar base [bottom], which walls thus collectively define a shallow container. By use of a minimum of closure means for the open top, the container space receives and retains the few "attachments" which serve to convert the box to a wheeled push cart, namely, a pair of individual wheels, transverse axle mount, and operating handle. In this collapsed state, the assembly can be stood upright upon any of the narrow side or end walls and thus hand-carried (like a suitcase) or stored in a minimum space such as against a wall, in a closet, or flat on a shelf or in a vehicle trunk. For hand-carrying, there is a grasp-handle mounted along one of the longer edges.

Each of the four low walls has a rectangular panel wall hingedly connected along its upper edge so that when outfolded to a stand-up (vertical) position, they can be latched together to form an extended "cargo space" extending upward continuous from the bottom of the shallow container. The upstanding panel walls are held together or braced by corner-located clevis elements, plus thrust-attachment arms of a U-shaped operating handle which are received by a pair of insertion sockets located on outer faces of a respective pair of opposing (side) panel walls.

A separate channel member carrying an axle projecting from each end, may be secured transversely (flat) against the under face of the chassis by means of a fixed pair of upstanding bolts which are affixed to the channel and upon mounting, traverse apertures in the bottom wall to be secured by respective wing nuts within the container. When the channel member is thus functionally attached, the projecting stub axles have an individual wheel and washers anchored thereto by retention pin. Assembly and disassembly is thus obtainable in a very minimum of time and effort.

As a typical field of usage: such collapsed, flat-sided container can be stored (stacked if there are several) in the trunk of an automobile or in other vehicle cargo space, while the vehicle is driven to the (limited) parking area which is nearest a boat dock. At such location, the "two-wheeled cart" form is quickly assembled and loaded (for one or more runs) with the articles destined for the yacht (and the vehicle then driven off). As soon as the cart is then unloaded into the boat, it is disassembled and likewise placed aboard. Thereafter, at any loading point (even if it has to be put ashore by a row boat), the cart can be reassembled and used to carry its cargo to any point beyond the waterline as long as there is a traction path for its two wheels. Similarly, it is usable in an urban setting; it can be hand carried to the supermarket (taken on a bus or street car if necessary) and wheeled home after being filled with groceries. In this connection, it should be noted that part of the weight is not borne by the "pusher" as is the case with a wheelbarrow, but all the cargo and cart weight is carried by the two wheels.

BRIEF DESCRIPTION OF THE DRAWINGS

FIG. 1 is a perspective view from above of the collapsible cart seen in functionally assembled position.

FIG. 2 is a perspective view of the completely collapsed cart seen standing upright on one end with the carrying handle shown in lateral projecting position.

FIG. 3 is a longitudinal vertical section through the left portion of the assembled cart with the right portion shown in elevation.

FIG. 4 is a top plan view of the assembled cart of FIG. 3 with the carrying handle shown extending horizontally outward in position to form a side guard for the cart and adjacent wheel.

FIG. 5 is a top plan view of the disassembled cart but with the foldable panel walls upstanding and the separable elements spread upon the cargo bed (for ease of identification).

FIG. 6 is a longitudinal vertical sectional view taken along staggered line 6—6 of FIG. 5, the end panels partially infolded.

FIG. 7 is a fragmental elevational view of a corner formed by adjacent panel walls coupled together by a clevis pin, with its alternate (rest) position shown in broken lines.

FIG. 8 is a plan view of the assembled cart but with its end panels downfolded in order to carry articles which are longer than the cart body.

DETAILED DESCRIPTION OF PREFERRED EMBODIMENT

A shallow, rectangular, open-top container 10 is formed by a flat bottom wall 12 and fixed upright, end 14, 16 and side 18,20 walls, Each of these low, continuous walls is hingedly connected lengthwise along its upper (horizontal) edge to a rectangular panel wall 15, 17, 19, 21 by the construction commonly called a piano hinge 22. The end walls 14, 16 are of little less height than the side walls 18, 20 so that the hinged end panels 15, 17 can be infolded with their (outer, now upper) faces even with or below the edge of the opposite hinged sides 18, 20.

The upper edge of each hinged panel is inwardly turned to form a bottom-opening U-channel 24. The cross portion of the U-channel of each elongated panel 19, 21 is formed with a single (vertical) aperture 25, 26 adjacent each end. Each corresponding channel end of the two end panels 15, 17 is formed with a pair of vertical apertures a, b, the members of each pair being spaced apart by the (horizontal) length or span 28 of a clevis c which is carried therein by insertion of dependent legs 29, 30 (of unequal length) and having a bottom cross arm 31 which is longer than the upper cross arm 28 (FIG. 7). Accordingly, when adjacent panels are upstanding with their channel corners brought together, each clevis pin c can be raised partway from its storage or idle position of FIG. 5, and turned to an insertion position wherein the short leg 29 is dropped into the aperture 25, thus coupling together a long panel 19 or 21 with a short or end panel 15 or 17 (FIG. 7). Each of the four corners is thus secured (leaving the four a apertures unoccupied, FIG. 1) so as to form a composite, much deeper, open-top container or cargo space than that initially formed by the shallow or low, fixed side walls. As a minimum measure of what constitutes a "shallow" container in this connection, it may be taken as that internal height which will house a separated wheel when the latter is laid flat therein and the panel walls are downfolded atop of it.

The upper or outer faces of the pair of long panels 19, 21, carry several fixtures or attachments. Adjacent a common end of the cart, there is laterally secured against the face of each panel, a tubular insertion socket 34, angularly directed so as (when both long panels are upstanding) to receive the corresponding ends of a U-shaped operating handle 36. A thumb screw 98 threadedly traverses the under surface of the socket to have its end bear against the socketed handle bar 36 so as to anchor it. At the same time, it will be seen that the anchored push/pull handle bar 36 braces the side panels 19, 21 (urging them inward since the arms 35, 37 are resilient and have to be manually spread somewhat for insertion). For light weight, the detachable handle 36 may be made of aluminum, and when separated, can be stored within the shallow container as seen in FIG. 5. The body walls may also be formed of aluminum.

About midlength of the "left side" panel 21 is mounted a bridge type fixture 40 with its slide opening 41 transversely aligned so as to receive the sliding end of an L-shaped, manual lock bolt 42 which is fastened to the opposing panel 19 by a thumb screw 44 having its end threadedly received in the panel after its shaft traverses a longitudinal slot 45. As seen particularly in FIG. 2, when the side panels 19, 21 are downfolded and the bolt end 42 slid through the bridge 40 tightening the screw 44 against the bolt 43, fastens all the panels "down" to form a compact "collapsed" case or housing. Alternatively, when the panels are functionally upstanding, the bolt 43 can be swung to the broken line position and the screw 44 again tightened to hold it in such "rest" position. Also mounted on this same panel 19 is a channel-shape handle 46 pivotally secured to bracket members 47, 48 so as to be swingable 90° to the right (as viewed in FIG. 2 or upward as viewed in FIG. 4) by which the thus collapsed case can be manually carried, that is, with the wall 20 generally parallel to and spaced a short distance above the ground.

To attach a pair of wheels 50 to the flat and essentially continuous bottom surface 12, there is provided a longitudinal cross channel 52 having a length equal to the width of the bottom wall 12 and a depth allowing a mutually aligned pair of stub axles 54, 56, to be welded thereto, each with a length projecting from its respective channel end. Spaced apart along the intermediate length of the channel, are welded an upstanding pair of threaded shafts or bolts 58, 60 which are in alignment with a corresponding pair of apertures 59, 61 which traverse the cart bottom 12. Thus, when the axle-carrying channel 52 is placed against the underface 12 of the cart, the pair of bolts 58, 60 project through the apertures 59, 61 into the interior of the container 10. To secure them (and the axle and wheel carrying channel) in such position, a pair of flat winged nuts 62 is provided, each with a central flat span with threaded aperture 63 and vertically offset, opposite wing tabs 64 parallel thereto, which latter form contact leverage wings for manually rotating the nut on the threaded shaft. When the nut is thus tightened down to the floor level, the pair of elevated flat wings provide barrier protection to the bolt-end against any shifting articles, loose within the container. Accordingly, with the axles thus functionally positioned, each wheel 50 is placed on its respective axle 54, 56 sandwiched between a pair of washers 64 and held by a retainer pin 66 inserted through an axle aperture.

For carrying articles which are longer than the bottom 12, such as lumber 70, the end panels 15, 17 can remain downfolded and the upstanding side panels 19, 21 braced by a cross rod 68 (FIG. 8) having downturned ends inserted in the apertures 26. In an emergency, such lumber may be replaced by a pallet (such as a door removed from its mounting) upon which an injured person may be placed and transported.

I claim:

1. A collapsible and hand-carryable cart assembly comprising in combination:

a generally rectangular, open-top, shallow container formed by a flat bottom wall and by short, upstanding, side and end walls fixed thereto and to each other, each of said walls having inner and outer faces, the container having handle means for manually carrying and storing the container when closed and held in generally vertical position with the outer face of one of said short walls disposed generally parallel to and adjacent the ground, the outer face of said bottom wall when upward-facing and dependently supported at a selected height being utilizable as a planar work surface rectangular, upright disposable panel walls each hingedly secured to an upper edge of a respective side or end wall plus position-reinforcing pin means adapted for bracing interconnection of adjacent pairs of said hinged panel walls when jointly disposed upright so as to form a container extension continuous upward from said shallow container, said panel walls being disposed alternately to be hingedly infolded so as to spacedly overlie the inner face of said bottom wall, and having latch means for selectively retaining them in such infolded closed position, the outer face of each of an opposing pair of panel walls having a thrust-insertion socket with lock means, adapted to receive and selectively retain an attachment arm of an operating handle, a separable, generally U-shaped manual operating handle having a pair of attachment arms adapted for insertion/retention in the respective sockets and thus to brace said opposing pair of panel walls in upright position, an elongated axle support member, storable within said shallow container and having a length approximating the width of said bottom wall, said member having an axle fixedly extending from each end thereof and having means for selective transverse attachment to the outer face of said bottom wall with said axles projecting outward therefrom, and a pair of wheels adapted to be functionally mounted on the respective axles and alternately individually to be stored within said shallow container when detached.

2. The cart assembly of claim 1 wherein said attachment means for the support member to the outer face of said bottom wall comprises a pair of upstanding bolts fixedly spaced apart along said support member and thus insertable through aligned apertures of said bottom wall, and wing nut means for engaging the end of each bolt within the shallow container and thus securing said support member thereto.

3. The cart assembly of claim 1 wherein said position-reinforcing pin means comprises a clevis located at each corner formed by the upstanding panel walls.

4. The cart assembly of claim 1 wherein the attachment arms of said U-shaped operating handle are resilient for urging said socket-carrying panel walls inward, and said operating handle is storage-receivable within said shallow container.

5. The cart assembly of claim 4 wherein the means for attachment of said axle support member to the outer face of said bottom wall comprises a pair of upstanding bolts fixedly spaced apart along said support member and thus insertable through aligned apertures of said bottom wall, and said position-reinforcing pin means comprises a clevis located at each corner formed by the upstanding panel walls.

6. In combination with a collapsible and hand-carryable cart assembly comprising a generally rectangular, shallow container formed by a flat bottom wall and by short, upstanding, side and end walls fixed thereto and to each other, forming a container of minimum height adapted to hold a pair of individual wheels for said cart when stored flat therein, said assembly including panel walls disposable upright from an upper edge of said shallow container so as to form a continuous upward extension of the shallow container and being infoldable to form a top closure for the same, the improvement comprising an elongated axle support member, storable within said shallow container and having a length approximating the width of said bottom wall, said member having an axle fixedly extending from each end thereof and having means for selective transverse attachment to the outer face of said bottom wall with said axles projecting outward therefrom said means comprises a pair of upstanding bolts fixedly spaced apart along said support member and thus insertable through aligned apertures of said bottom wall, and means for engaging within the shallow container the end of each bolt thus inserted, thereby securing said axle support member thereto, and a pair of wheels adapted to be functionally mounted on the respective axles and alternately individually to be stored within said shallow container when detached, whereby in the absence of the attached axle support member said flat bottom wall forms a support surface for stacking such containers or alternately provides a planar work surface upon inversion of the container.

* * * * *